United States Patent
Azuma et al.

(10) Patent No.: US 11,710,914 B2
(45) Date of Patent: Jul. 25, 2023

(54) OPTICAL MODULE

(71) Applicant: FUJITSU OPTICAL COMPONENTS LIMITED, Kawasaki (JP)

(72) Inventors: Tomonori Azuma, Ota (JP); Tetsuo Ishizaka, Inagi (JP); Koji Otsubo, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 316 days.

(21) Appl. No.: 16/849,474

(22) Filed: Apr. 15, 2020

(65) Prior Publication Data

US 2020/0373691 A1 Nov. 26, 2020

(30) Foreign Application Priority Data

May 24, 2019 (JP) .................................. 2019-098133

(51) Int. Cl.
*G02B 6/42* (2006.01)
*H01R 12/52* (2011.01)
*H01R 12/62* (2011.01)

(52) U.S. Cl.
CPC ........... *H01R 12/52* (2013.01); *G02B 6/4269* (2013.01); *G02B 6/4281* (2013.01); *H01R 12/62* (2013.01)

(58) Field of Classification Search
CPC .................................................... H01R 12/52
See application file for complete search history.

(56) References Cited

U.S. PATENT DOCUMENTS

| | | | |
|---|---|---|---|
| 5,283,446 A * | 2/1994 | Tanisawa | G02B 6/42 257/737 |
| 2003/0202673 A1 | 10/2003 | Tajima et al. | |
| 2012/0014639 A1* | 1/2012 | Doany | G02B 6/02042 427/163.2 |
| 2013/0308898 A1 | 11/2013 | Doerr et al. | |
| 2014/0161457 A1* | 6/2014 | Ho | H04B 10/506 398/79 |
| 2015/0098675 A1* | 4/2015 | Ishiyama | G02B 6/4284 385/14 |
| 2016/0379911 A1 | 12/2016 | Cahili et al. | |
| 2017/0054269 A1 | 2/2017 | Tamura et al. | |
| 2018/0131448 A1* | 5/2018 | Yagisawa | H01L 25/167 |
| 2018/0217343 A1* | 8/2018 | Matsumura | H01S 5/02438 |

(Continued)

FOREIGN PATENT DOCUMENTS

| | | |
|---|---|---|
| CN | 1455620 | 11/2003 |
| CN | 104516066 | 4/2015 |
| JP | 8-172144 | 7/1996 |

(Continued)

OTHER PUBLICATIONS

Office Action, dated Aug. 3, 2021, in corresponding Chinese Patent Application No. 202010330373.0 (17 pp.).

(Continued)

*Primary Examiner* — Nathan M Cors
(74) *Attorney, Agent, or Firm* — Staas & Halsey LLP

(57) ABSTRACT

An optical module includes: a first board having an optical component bonded thereto with an adhesive; a connection structure part rising from the first board and made of a material having lower thermal conductivity than thermal conductivity of a material of the first board; and a second board joined to the connection structure part.

8 Claims, 10 Drawing Sheets

(56) References Cited

U.S. PATENT DOCUMENTS

2020/0052461 A1* 2/2020 Belley ................ H01S 5/02375

FOREIGN PATENT DOCUMENTS

| JP | 2009-105199 | 5/2009 |
| JP | 2015-29043 | 2/2015 |
| JP | 2017-41618 | 2/2017 |

OTHER PUBLICATIONS

Notice of Reasons for Refusal, dated Oct. 25, 2022, in corresponding Japanese Patent Application No. 2019-098133 (6 pp.).
Office Action, dated Sep. 7, 2022, in corresponding Chinese Patent Application No. 202010330373.0 (15 pp.).
Office Action, dated Dec. 16, 2022, in corresponding Chinese Patent Application No. 202010330373.0 (18 pp.).
Chinese Office Action dated Apr. 13, 2023 for Chinese Patent Application No. 202010330373.0.

* cited by examiner

FIG.8
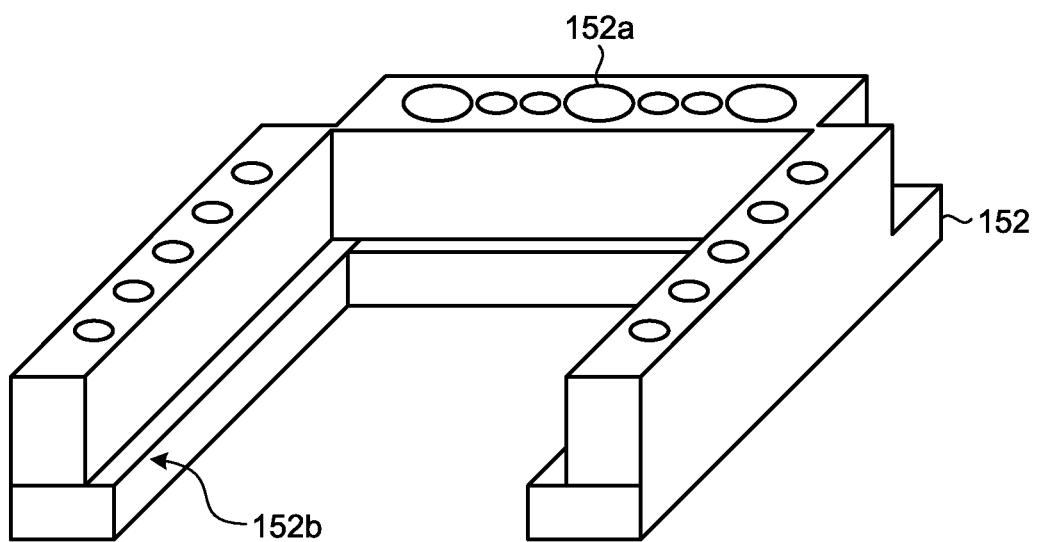
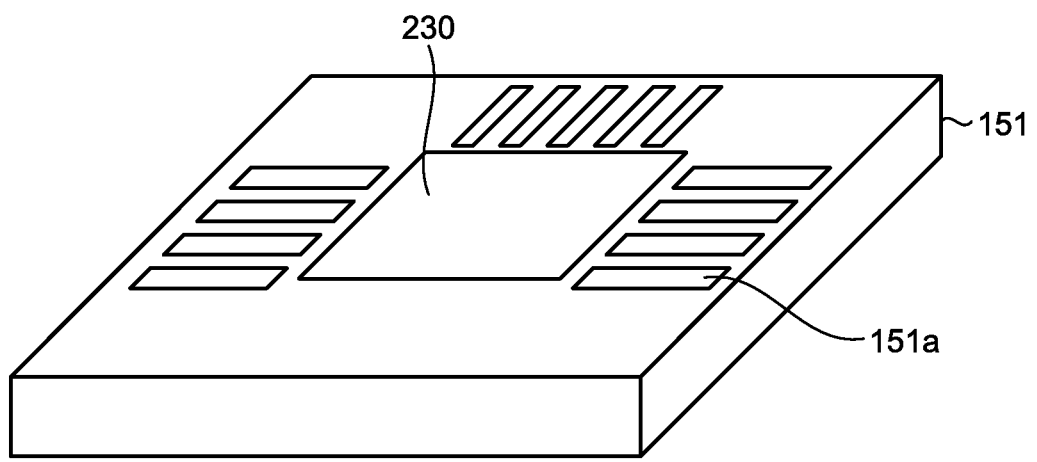

OPTICAL MODULE

CROSS-REFERENCE TO RELATED APPLICATION

This application is based upon and claims the benefit of priority of the prior Japanese Patent Application No. 2019-098133, filed on May 24, 2019, the entire contents of which are incorporated herein by reference.

FIELD

The embodiment discussed herein is related to an optical module.

BACKGROUND

In general, an optical transceiver that is used for communication of optical signals is separated into an optical device part to perform signal conversion between optical and electrical signals and an electric circuit part to perform signal processing on an electrical signal. The demand for a smaller, more highly functional, and less expensive optical transceiver has been increasingly higher. As techniques for mounting an optical device part, an optical subassembly (OSA) technique in which to integrate optical elements, such as an optical modulator, in a metal package has been increasingly replaced by another technique in which to mount such optical elements on a circuit board directly or via a relay board.

A technique, such as a chip-on-board (COB) technique, in which to mount optical elements directly on a circuit board, can eliminate high-cost members such as a metal package and can simplify production processes with the use of reflow soldering for mounting components, and is therefore expected to reduce the cost by enabling. Such a technique is also expected to provide enhanced ease of assembly in such a manner that, after a subassembly is obtained by mounting optical elements on a relay board, the relay board is mounted on a circuit board by reflow soldering.

In the optical device part, optical components such as a lens and a fiber are mounted in addition to optical elements such as an optical modulator. Such an optical component is a component that optically couples together an optical element and an optical fiber and, in some cases, needs to be mounted with high positional precision, for example, of 1 μm or less. For that reason, in recent years, a precision adhesive intended for bonding of optical components is advantageous in terms of mountability, facility cost, and size-reducing integration and is therefore generally used for mounting optical components.

Examples of a related conventional technique include Japanese Laid-open Patent Publication No. 8-172144, Japanese Laid-open Patent Publication No. 2009-105199, the specification of U.S. Patent Application Publication No. 2015/0098675, and the specification of U.S. Patent Application Publication No. 2016/0379911.

However, the difficulty to successfully enable both mounting of an optical component with an adhesive and mounting of other components by reflow soldering has been remaining as an inconvenience. That is, for example, in the COB technique or a technique in which a relay board is mounted on a circuit board by reflow soldering, a circuit board or a relay board that has an optical component such as a lens mounted thereon is heated to a high temperature during reflow soldering. During the reflow soldering, an adhesive used for mounting the optical component is molten or deformed, which may result in loss of a desired capability of the optical component.

A specific example is as follows. SAC (Sn, Ag, and Cu) solder, which is generally used for reflow soldering, has a melting point of about 220 degrees Celsius and a component is therefore heated to, for example, about 250 degrees Celsius. In contrast, precision adhesives intended for bonding of optical components have glass transition temperatures of several tens to a hundred and several tens of degrees Celsius. Thus, when a circuit board or a relay board having an optical component mounted thereon with an adhesive is subjected to reflow soldering, the quality of the cured adhesive changes, whereby the optical component moves out of the correct position thereof. This reduces the precision of optical coupling as a result, and results in loss of a desired capability.

There is a precision adhesive developed recently that has a glass transition temperature of about 200 degrees Celsius and is highly thermally resistant. However, the adhesive itself is expensive and drives up the cost, and such a highly thermally resistant precision adhesive still has a glass transition temperature lower than the melting point of SAC solder and does not eliminate the risk of having an optical component forced out of the correct position thereof during reflow soldering. Although it is possible to use low melting point solder in combination with a highly thermally resistant adhesive, this further drives up the cost and is not realistic. When an optical component needs to satisfy high positional precision, it has been thus difficult to successfully enable both mounting of an optical component with an adhesive and mounting of other components by reflow soldering.

SUMMARY

According to an aspect of an embodiment, an optical module includes: a first board having an optical component bonded thereto with an adhesive; a connection structure part rising from the first board and made of a material having lower thermal conductivity than thermal conductivity of a material of the first board; and a second board joined to the connection structure part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates configuration examples of a main board and a connection structure part;

DESCRIPTION OF EMBODIMENTS

Preferred embodiments of the present invention will be explained with reference to accompanying drawings. This embodiment is not intended to limit the present invention.

Figure 1:
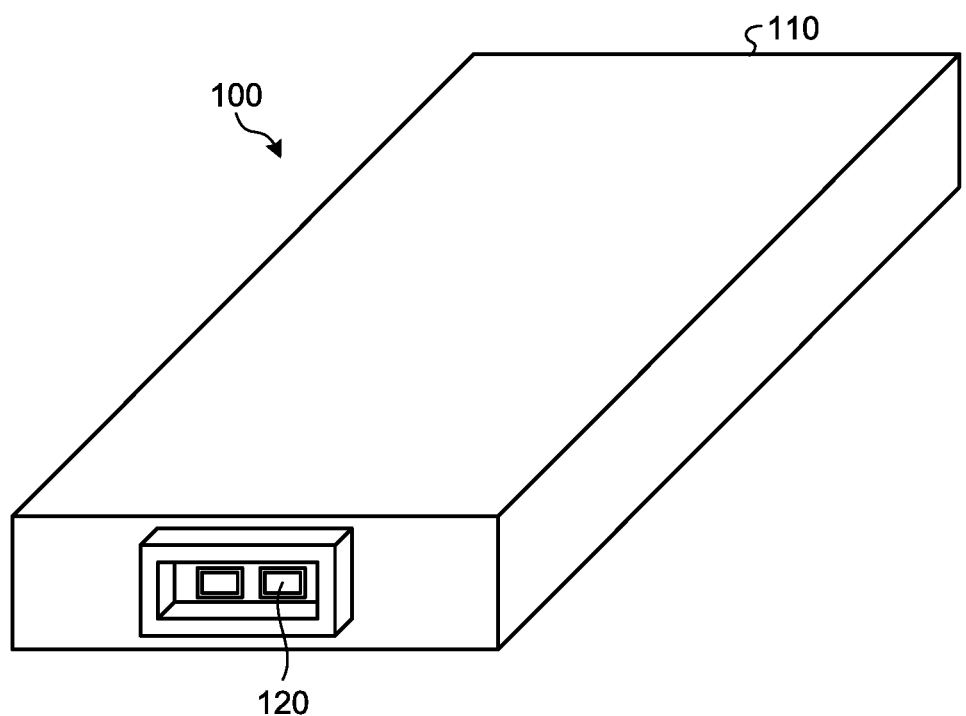
FIG. 1 is a perspective view illustrating the outer appearance of an optical module according to an embodiment.

FIG. 1 is a perspective view illustrating the outer appearance of an optical module 100 according to the embodiment. The optical module 100 may be, for example, an optical transmitter in an optical transceiver or the like that is used for communication of optical signals. The optical module 100 has a configuration in which an optical connector part 120 is provided in a housing 110 made of metal, for example. The housing 110 internally holds and supports a circuit board for an optical module 100 and various components. The optical connector part 120 is a connector into and from which an optical fiber can be inserted and removed and serves as an input/output unit for optical signals to and from the optical module 100 with an optical fiber connected thereto.

Figure 2:
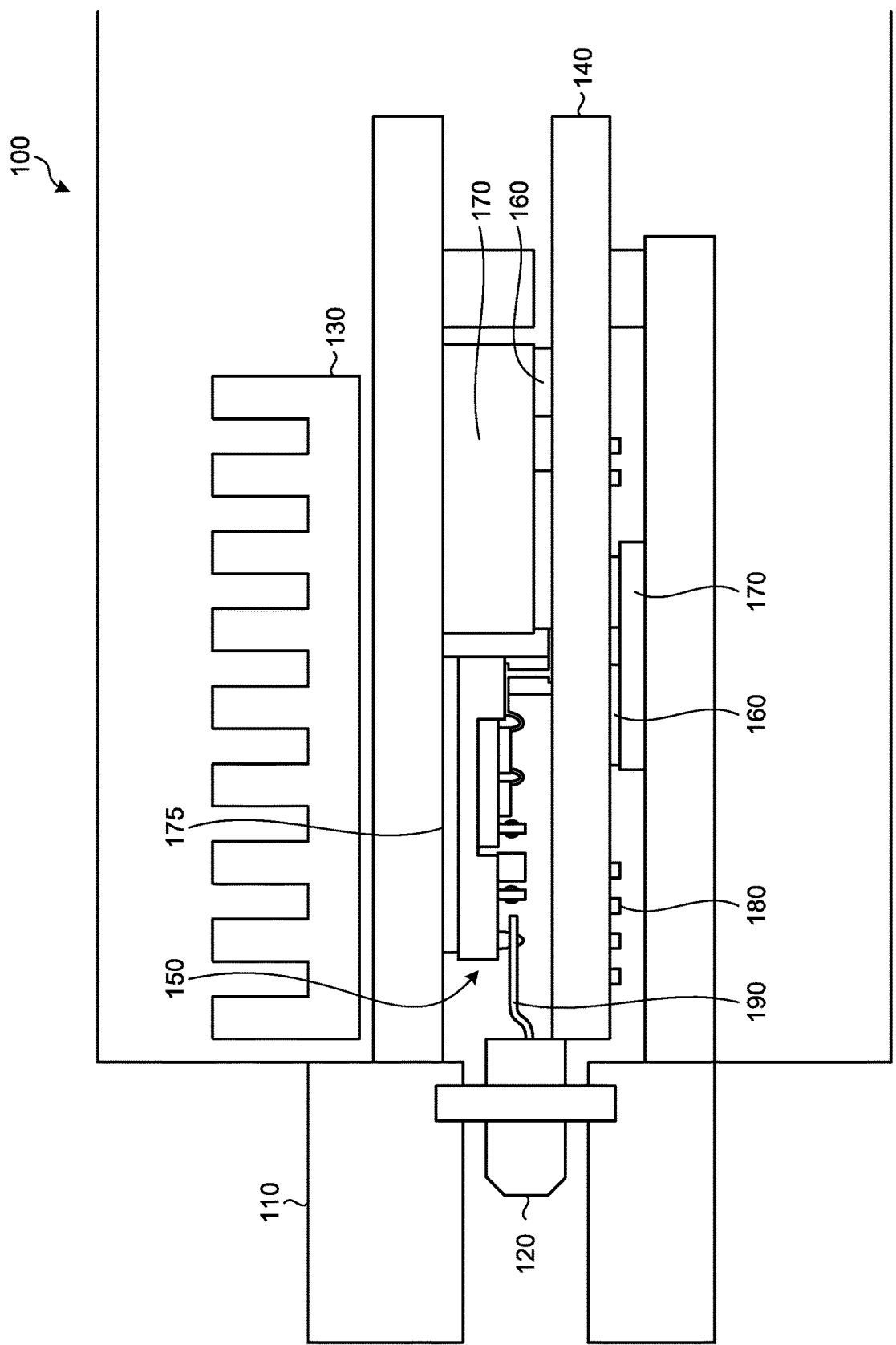
FIG. 2 illustrates the configuration of the optical module according to the embodiment.

FIG. 2 illustrates the configuration of the optical module 100 according to the embodiment. In FIG. 2, a section of the optical module 100 is schematically illustrated. As illustrated in FIG. 2, the optical module 100 includes the housing 110, the optical connector part 120, a heat sink 130, a circuit board 140, an optical processing unit 150, an integrated circuit (IC) chip 160, heat dissipating members 170 and 175, electronic components 180 and an optical fiber 190.

The heat sink 130 is made of, for example, metal such as aluminum and dissipates heat absorbed by the heat dissipating members 170 and 175 from the optical processing unit 150 and the IC chip 160. The heat sink 130 has a plurality of radiating fins for the purpose of increasing the heat dissipation efficiency thereof by enlarging a surface area thereof contacting the air.

The circuit board 140 is a board on which the optical processing unit 150, an IC chip, and the electronic components 180. Interconnections that electrically connect various components to one another have been printed on a surface and an internal layer of the circuit board 140. Reflow soldering is performed for mounting the optical processing unit 150, the IC chip, and the electronic components 180 on the circuit board 140.

While holding components that process optical signals, the optical processing unit 150 receives input of and outputs optical signals from and to the optical connector part 120 and performs photoelectrical conversion to receive input of and output electrical signals to and from the circuit board 140. The optical processing unit 150 includes a main board having optical components, such as a lens and an optical filter, and peripheral components, such as an optical modulator and a driver, mounted thereon and has a configuration in which the main board is connected onto the circuit board 140 via a connection structure part that is highly thermally insulating. The configuration of the optical processing unit 150 is detailed down below.

The IC chip 160 is mounted on a surface of the circuit board 140 and performs various kinds of processing using electrical signals. The circuit board 140 may have the IC chips 160 mounted on surfaces on both sides thereof.

The heat dissipating member 170 is provided in contact with a component that is relatively easy to generate heat, such as the IC chip 160, and absorbs heat. The heat dissipating member 170 dissipates heat by transmitting the heat to the housing 110 and the heat sink 130.

The heat dissipating member 175 is provided in contact with the optical processing unit 150, which is relatively easy to generate heat, and absorbs heat. The heat dissipating member 175 dissipates heat by transmitting the heat to the housing 110 and the heat sink 130.

The electronic components 180 are, for example, components such as a capacitor and a resistor and are connected to interconnections provided on a surface or an internal layer of the circuit board 140.

The optical fiber 190 connects the optical connector part 120 and the optical processing unit 150 to each other. That is, the optical fiber 190 has one end thereof connected to the optical connector part 120 and has the other end thereof connected to the optical processing unit 150. The optical fiber 190 thus transmits optical signals between the optical connector part 120 and the optical processing unit 150. When there is another optical fiber connected to the optical connector part 120 from the outside, this optical fiber and the optical fiber 190 are optically coupled to each other.

Figure 3:
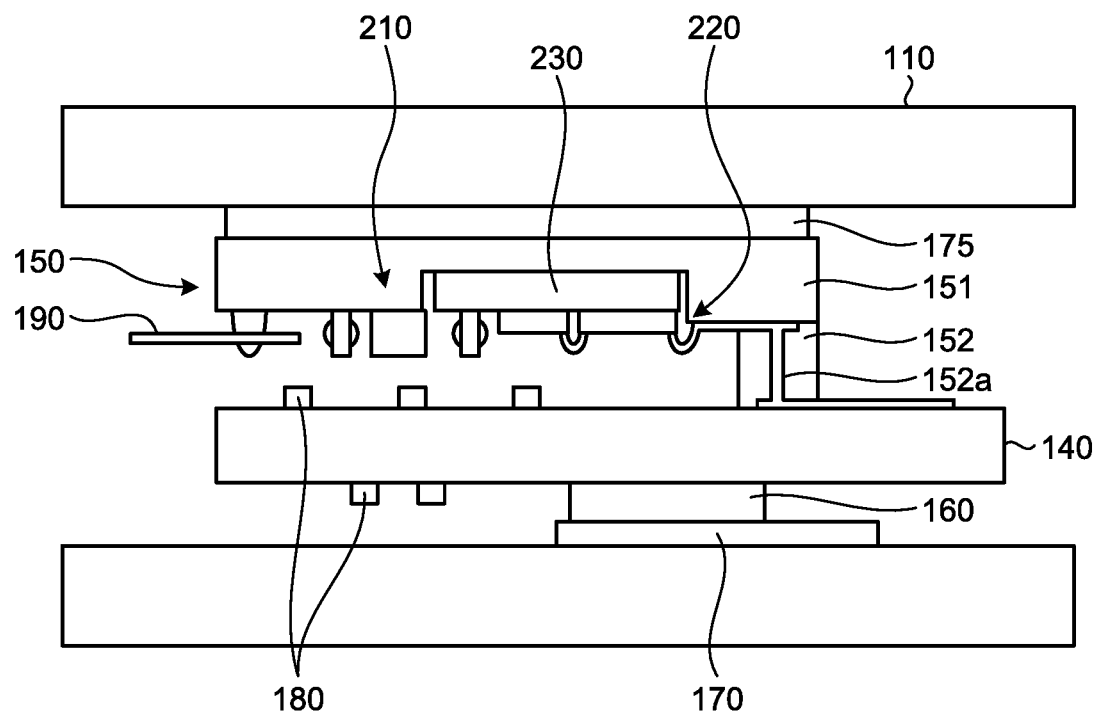
FIG. 3 illustrates an enlarged view of the neighborhood of an optical processing unit.

FIG. 3 illustrates an enlarged view of the neighborhood of the optical processing unit 150. As illustrated in FIG. 3, the optical processing unit 150 includes a main board 151 and a connection structure part 152 and has a configuration in which the main board 151 has optical components 210, peripheral components 220, and a thermoelectric cooler (TEC) 230 mounted on one side thereof. The main board 151 has the heat dissipating member 175 provided in contact thereto, whereby the heat dissipating member 175 absorbs heat generated by the peripheral components 220. For example, aluminum nitride (AlN) is used as a material of the main board 151. The main board 151 has the optical components 210 and the peripheral components 220 mounted on an outside surface thereof and has interconnections thereon that are connected to the peripheral components 220 and the TEC 230.

As the optical components 210, a ferrule, a lens, and an optical filter are included for example and constitute an optical path through which an optical signal passes. These optical components 210 are bonded to the main board 151 with a precision adhesive. As the peripheral components 220, an optical element such as an optical modulator or an optical demodulator, a driver, and an amplifier are included, which together perform conversion between an optical signal and an electrical signal. These peripheral components 220 are mounted on the main board 151 by reflow soldering using, for example, SAC solder. Each of the peripheral components 220 is electrically connected to an interconnection on the main board 151 or another one of the other peripheral components 220 by, for example, wire bonding. The TEC 230 is an element that controls mainly the temperatures of the peripheral components 220 and is buried in the main board 151. TEC 230 is provided in contact with the peripheral components 220 and cools the peripheral components 220, which generate heat.

The connection structure part 152 rises from a peripheral portion of the main board 151, and the connection structure part 152 is joined to the circuit board 140. Via patterns 152a that electrically connect interconnections on the main board 151 to interconnections on the circuit board 140 are formed through the inside of the connection structure part 152. As described below, the connection structure part 152 rises from three sides out of the four sides of the periphery of the main board 151 and supports the main board 151 over the circuit board 140.

While, for example, an insulating resin is used as a material for the connection structure part 152, the connection structure part 152 is made of a material having thermal conductivity that is lower than the thermal conductivity of the main board 151. That is, the connection structure part 152 conducts heat less easily than the main board 151. Preferably, the connection structure part 152 is made of a thermally insulating material.

Figure 4:
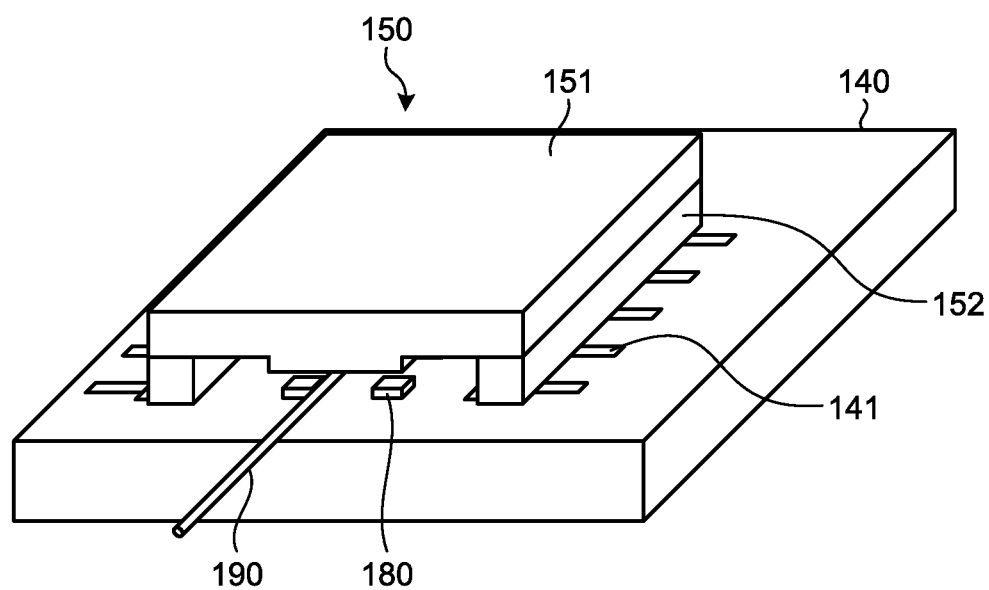
FIG. 4 is a perspective view illustrating the configuration of the optical processing unit.

As illustrated in FIG. 4, the connection structure part 152 is mounted on the circuit board 140 by reflow soldering so that each interconnection 141 on the circuit board 140 and the via pattern 152a can be connected to each other. Although this mounting by reflow soldering involves heating of the circuit board 140, thermal conduction from the circuit board 140 to the main board 151 is suppressed because of the low thermal conductivity of the connection structure part 152. This prevents the adhesive used for bonding the optical components 210 mounted on the main board 151 from being heated and thus can prevent the optical components 210 from moving out of the correct positions as a result of deformation of the adhesive. Additionally, the main board 151 is supported by the connection structure part 152, and a space is thereby generated between the main board 151 and the circuit board 140. This space is utilized to enable the electronic components 180 to be mounted on the circuit board 140. This can result in effective utilization of surfaces of the circuit board 140 and thus result in a smaller footprint.

Figure 5:
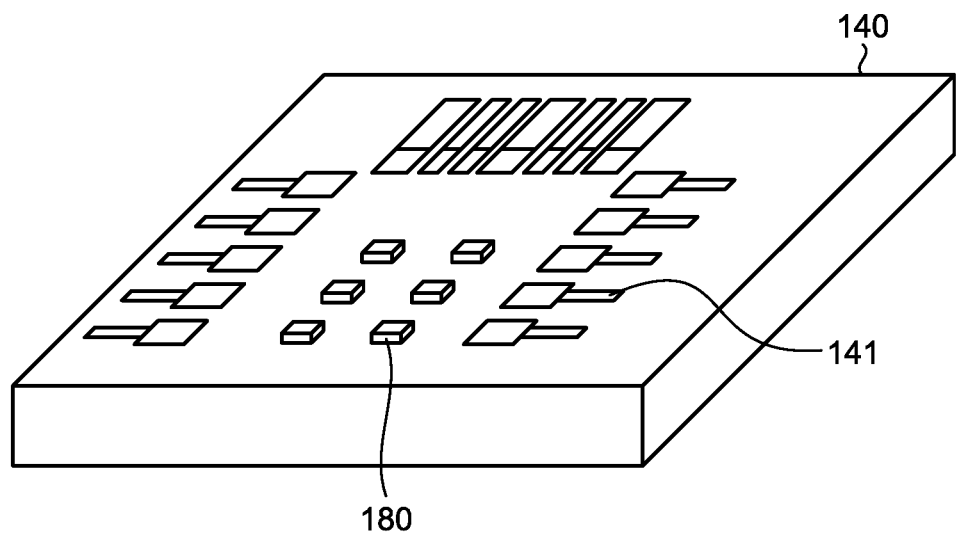
FIG. 5 illustrates the configuration of a circuit board.

Specifically, on the circuit board 140, in a region on which the optical processing unit 150 is mounted, the interconnections 141 are formed in positions corresponding to the via pattern 152a of the connection structure part 152, for example, as illustrated in FIG. 5. Furthermore, the electronic components 180 are mounted in positions that face the main board 151. Although not illustrated in FIG. 5, the IC chip 160 and the like may be mounted on the circuit board 140.

Figure 6:
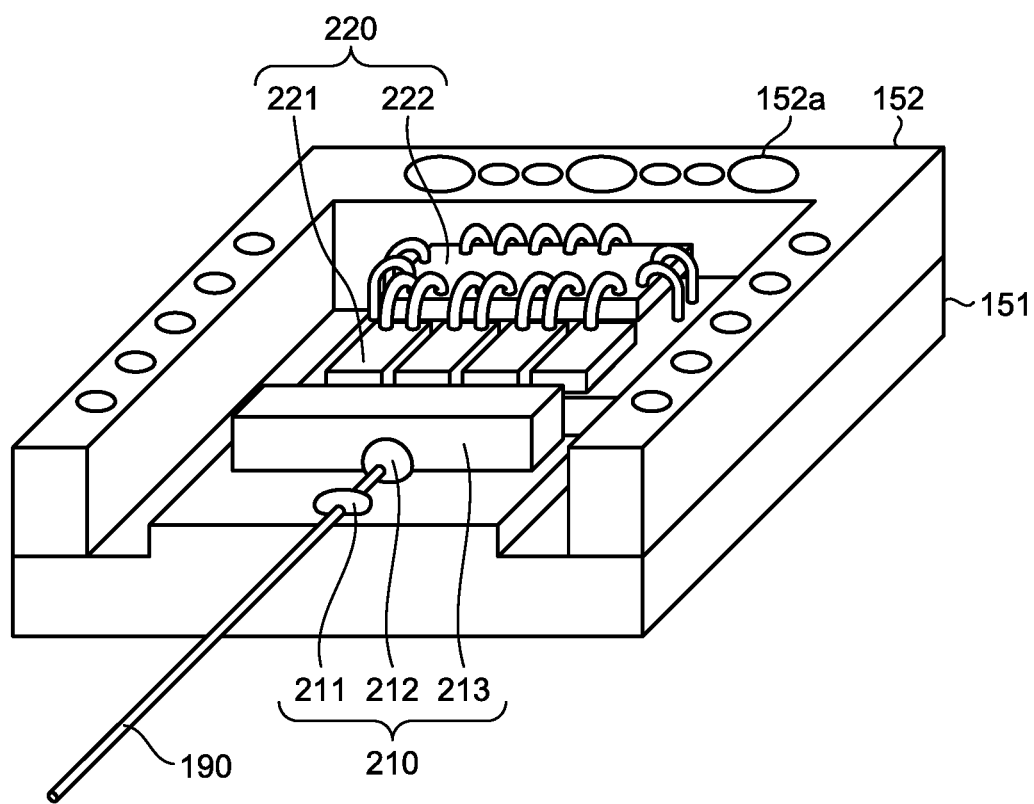
FIG. 6 is a perspective view illustrating the configuration of the optical processing unit.

Separately, the optical components 210 such as a ferrule 211, a lens 212, and an optical filter 213 and the peripheral components 220 such as optical elements 221 and a driver 222 are mounted on the main board 151 for the optical processing unit 150, for example, as illustrated in FIG. 6.

The ferrule 211 holds one end of the optical fiber 190, so that an end face of the optical fiber 190 corresponds to the position of the lens 212. The lens 212 inputs, to the optical filter 213, an optical signal emitted from the optical fiber 190 or inputs, to the optical fiber 190, an optical signal output from the optical filter 213. The optical filter 213 filters an optical signal input thereto from the lens 212 or an optical signal input thereto from the optical element 221. These optical components 210 are bonded to the main board 151 with an adhesive after being positioned with high precision, for example, with errors of about 1 μm.

The optical element 221 includes, for example, an optical modulator or an optical demodulator to output an optical signal to the optical component 210 after modulating light from a light source or to acquire an electrical signal after demodulating light input from the optical component 210. The driver 222 drives the optical element 221 to input an electrical signal to the optical element 221 or to acquire an electrical signal from the optical element 221. The driver 222 is connected to an interconnection on the main board 151 by, for example, wire bonding and is electrically connected to the interconnection 141 on the circuit board 140 through the foregoing interconnection and the via pattern 152a in the connection structure part 152. The optical elements 221 and the driver 222 are likely to generate heat and may be disposed on the TEC 230. The peripheral components 220 such as the optical elements 221 and the driver 222 are mounted on the main board 151 by reflow soldering, for example. When being to be mounted by reflow soldering, the peripheral components 220 are mounted on the main board 151 before the optical components 210 are mounted thereon.

The connection structure part 152 rises at a peripheral portion of the main board 151 that surrounds the optical components 210 and the peripheral components 220 from three sides. That is, the connection structure part 152 rises at three sides of the main board 151 other than one side thereof to which the optical fiber 190 is connected. The connection structure part 152 is formed of a material having thermal conductivity that is lower than the thermal conductivity of the main board 151. The via patterns 152a of a conductor that transmit, to the circuit board 140, electrical signals input to and output from the peripheral components 220 are formed inside the connection structure part 152. That is, each of the via patterns 152a is formed by disposing a conductor through a through-hole that penetrates the connection structure part 152 from a surface thereof making contact with the main board 151 to a surface making contact with the circuit board 140, and connects interconnections on the main board 151 to the interconnections 141 on the circuit board 140.

The optical processing unit 150 configured as illustrated in FIG. 6 is turned upside down and joined to the circuit board 140 illustrated in FIG. 5. In this joining, each of the interconnections 141 on the circuit board 140 and the corresponding via pattern 152a in the connection structure part 152 are positioned against each other so as to make contact with each other, and reflow soldering is performed for mounting. During the mounting by reflow soldering, while each of the interconnections 141 and the corresponding via pattern 152a are soldered to each other with the circuit board 140 being heated, thermal conduction from the circuit board 140 to the main board 151 is suppressed because of the low thermal conductivity of the connection structure part 152. This prevents the adhesive used for bonding the optical components 210 mounted on the main board 151 from being heated and thus can prevent the optical components 210 from moving out of the correct positions as a result of deformation of the adhesive.

Figure 7:
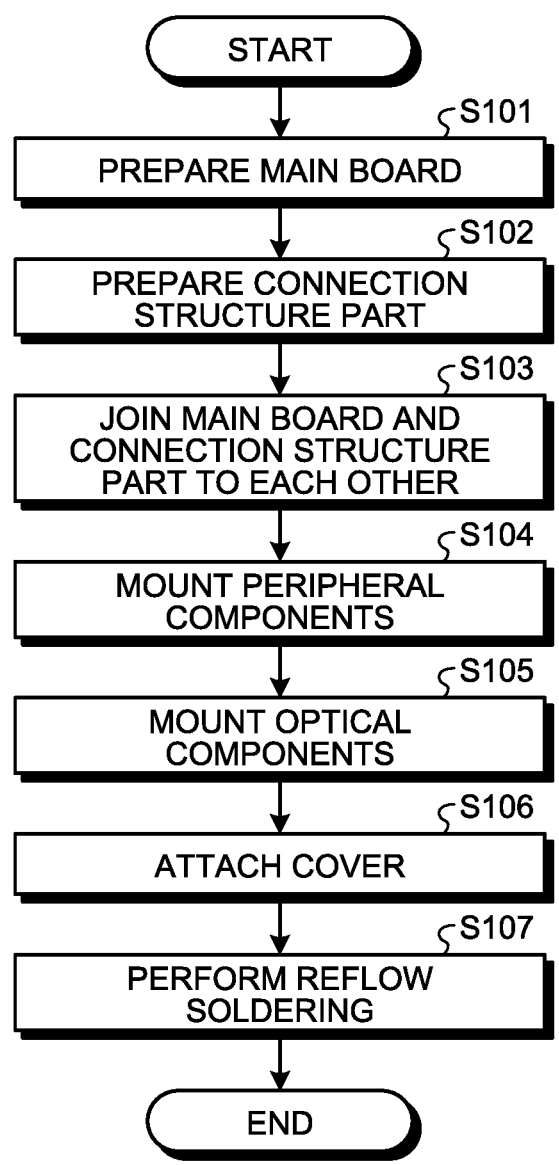
FIG. 7 is a flowchart illustrating a method for producing the optical module according to an embodiment.

Next, a method for producing the optical module 100 thus configured is described using a specific example with reference to the flowchart illustrated in FIG. 7.

At the start, the optical processing unit 150 on which the optical components 210 and the peripheral components 220 are to be mounted is prepared. Specifically, the main board 151 is prepared in such a manner that interconnections 151a are disposed on and the TEC 230 is buried in the main board 151 for which, for example, AlN is used as a material (step S101), for example, as illustrated in FIG. 8. The main board 151 may be either a single-layer board or a multiple-layer board and may be a board that has an excavated portion or a step. The main board 151 has the peripheral components 220 to generate heat mounted on one surface thereof and has the heat dissipating member 175 attached to another surface opposite to the one surface. Therefore, heat dissipation efficiency is improved when the main board 151 is prepared using a material having relatively high thermal conductivity.

The connection structure part 152 is prepared using, as a material therefor, a resin that has lower thermal conductivity than that of the main board 151 (step S102). That is, a resin is formed in a U-shape corresponding to three sides at the periphery of the main board 151, and the via patterns 152a are disposed in positions corresponding to the interconnections 151a on the main board 151. The diameter of each of the via patterns 152a is made as small as possible, whereby thermal conduction through the via patterns 152a is suppressed. A step 152b is provided on the inner wall of the connection structure part 152. The step 152b is provided in a position such that the height thereof from the main board 151 is higher than the heights of the optical components 210 and the peripheral components 220 after the connection structure part 152 is joined to the main board 151. As described later, the step 152b serves to position a cover that protects the optical components 210 and the peripheral components 220.

The main board 151 and the connection structure part 152 are joined to each other with gold tin (AuSn), solder, or a conductive adhesive (step S103). In this joining, each of the interconnections 151a on the main board 151 and the corresponding via pattern 152a in the connection structure part 152 are connected to each other.

Figure 9:
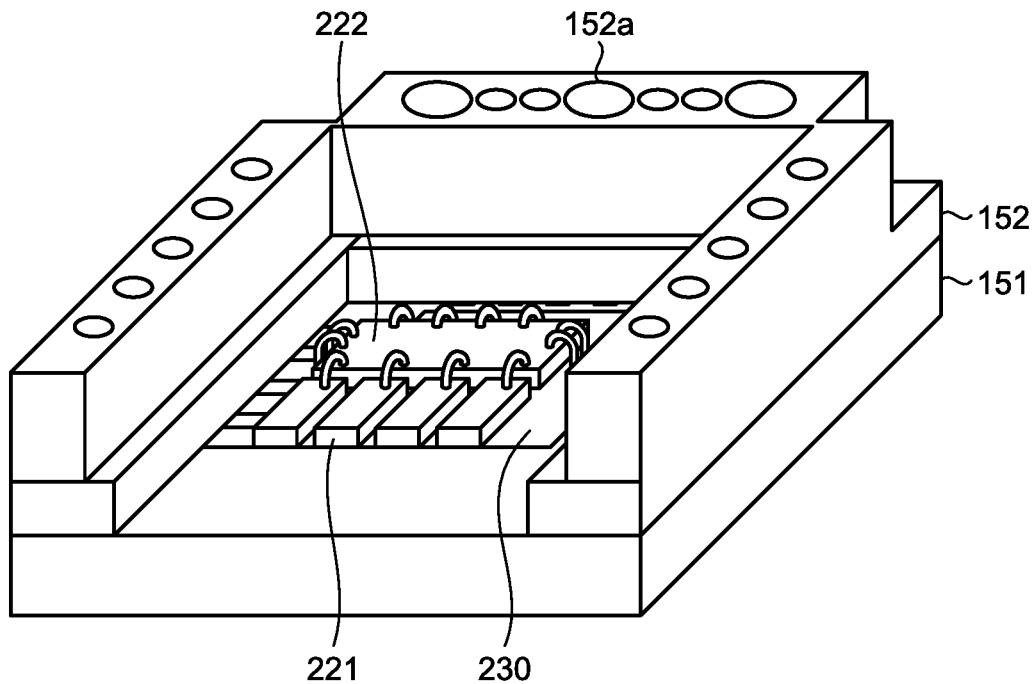
FIG. 9 illustrates mounting of peripheral components.

Subsequently, the peripheral components 220 are mounted on the main board 151 (step S104), for example, as illustrated in FIG. 9. That is, the optical elements 221, the driver 222, and the like are mounted on the main board 151 with, for example, AuSn or an adhesive. In this mounting, the peripheral components 220 may be disposed on the TEC 230. Subsequently, the peripheral component 220 and the interconnection 151a on the main board 151 are electrically connected to each other by wire bonding if such a need arises. Each of the peripheral components 220 may be mounted by flip-chip packaging instead of wire bonding.

Figure 10:
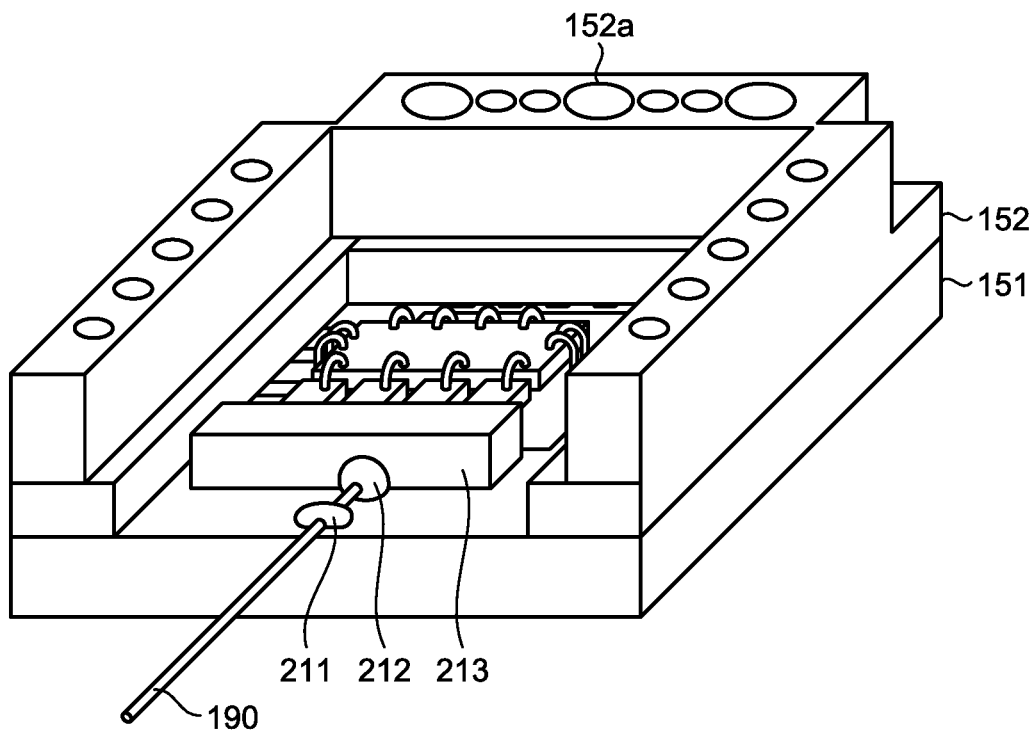
FIG. 10 illustrates mounting of optical components.
Figure 11:
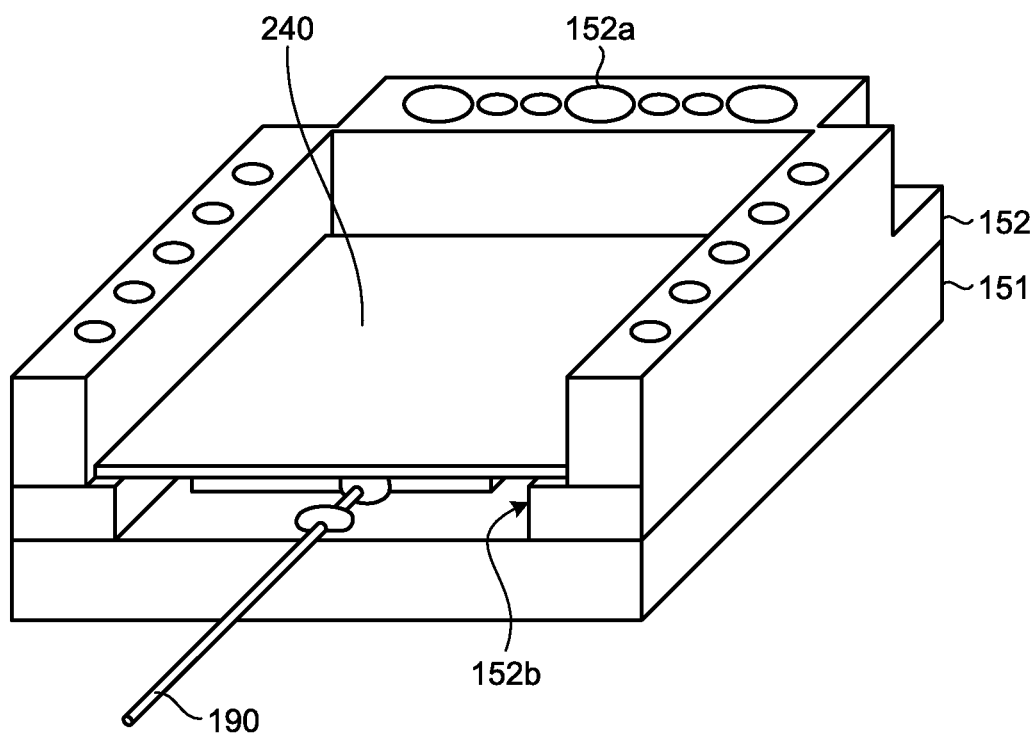
FIG. 11 illustrates attachment of a cover.

Subsequently, the optical components 210 are mounted on the main board 151 (step S105), for example, as illustrated in FIG. 10. That is, the ferrule 211, the lens 212, the optical filter 213, and the like are bonded on the main board 151 with, for example, a precision adhesive. As the adhesive to be used for bonding the optical component 210, an ultraviolet curing resin that is hardened by being irradiated with an ultraviolet ray can be used for example. The optical components 210 are mounted with small position errors of, for example, about 1 μm.

After the optical components 210 and the peripheral components 220 are mounted on the main board 151, a cover 240 is attached to the connection structure part 152 (step S106). The cover 240 is positioned by the step 152b and covers the optical components 210 and the peripheral components 220 by being supported by the inner wall of the connection structure part 152. The optical processing unit 150 is completed by the completion of this step.

Figure 12:
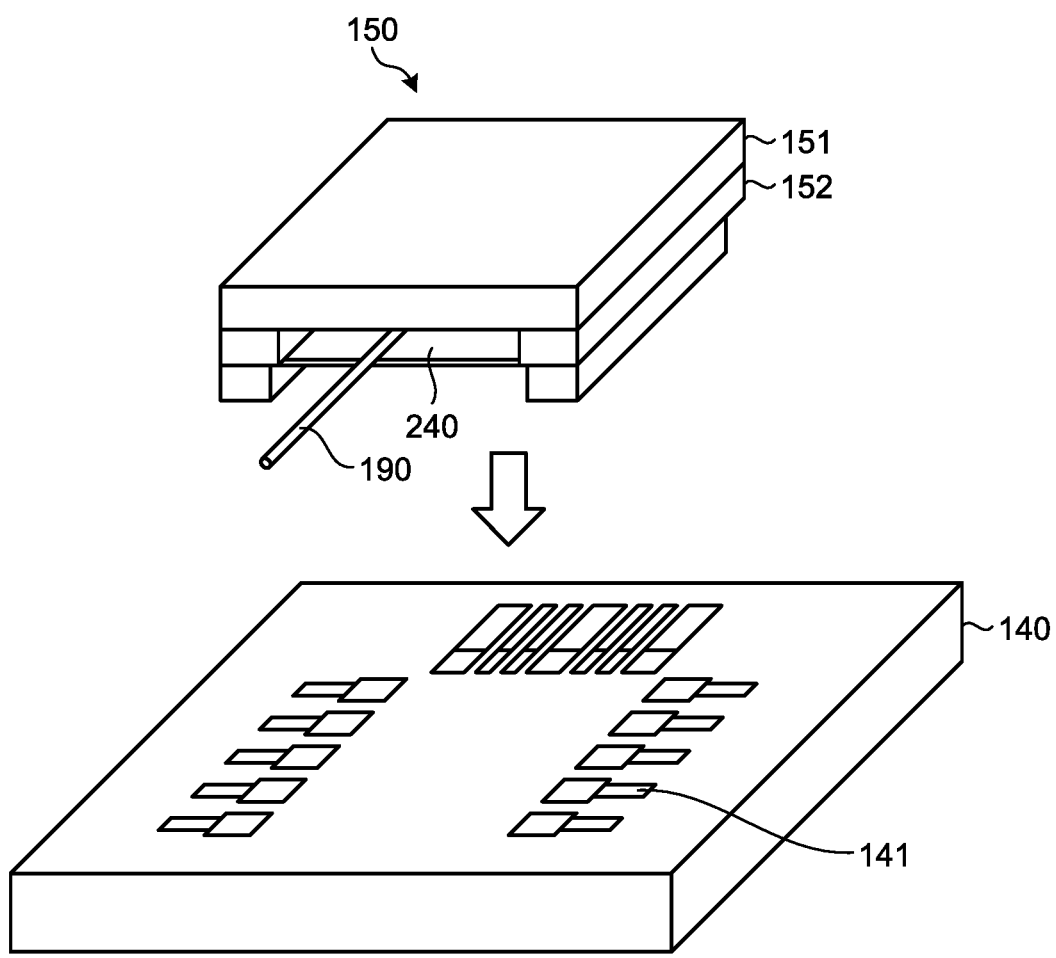
FIG. 12 illustrates reflow soldering.

Subsequently, the optical processing unit 150, together with other components such as the IC chip 160, is mounted on the circuit board 140 by reflow soldering (step S107). Specifically, the circuit board 140 having reflow solder applied to the interconnections 141 is heated, and the optical processing unit 150 turned upside down is joined onto the circuit board 140, for example, as illustrated in FIG. 12. In this joining, each of the interconnections 141 and the corresponding via pattern 152a in the connection structure part 152 are positioned against each other. During reflow soldering, the thermal conductivity of the connection structure part 152 making contact with the circuit board 140 is low while the circuit board 140 is heated. Therefore, thermal conduction from the circuit board 140 to the main board 151 is suppressed, and the main board 151 is not heated. This prevents the adhesive used for bonding the optical components 210 mounted on the main board 151 from being heated and thus can prevent the optical components 210 from moving out of the correct positions as a result of deformation of the adhesive.

Furthermore, while solder flux may spatter during reflow soldering, the optical components 210 and the peripheral components 220 are protected by the cover 240, whereby the spattering flux is prevented from being attached to the optical components 210 and the like. This prevents the optical path from being blocked by flux and thus enables reliable input and output of optical signals.

The heat dissipating members 170 and 175 are attached to the optical processing unit 150 and the IC chip 160 that have been mounted on the circuit board 140 if such a need arises, and the circuit board 140 is installed into the housing 110. In this installation, the optical fiber 190 is connected to the optical connector part 120. The optical module 100 is completed by the completion of this step.

As described above, according to the present embodiment, a main board having optical components bonded thereto with an adhesive and a connection structure part rising from a peripheral portion of the main board and made of a material having lower thermal conductivity than that of the main board form an optical processing unit, and the connection structure part of the optical processing unit is mounted, together with other components, on a circuit board by reflow soldering. Thus, even when the circuit board is heated during the mounting by reflow soldering, thermal conduction from the circuit board to the main board is suppressed by the connection structure part, whereby the optical components bonded to the main board are prevented from moving out of correct positions. In other words, both mounting of optical components by bonding and mounting of other components by reflow soldering are successfully enabled.

Figure 13:
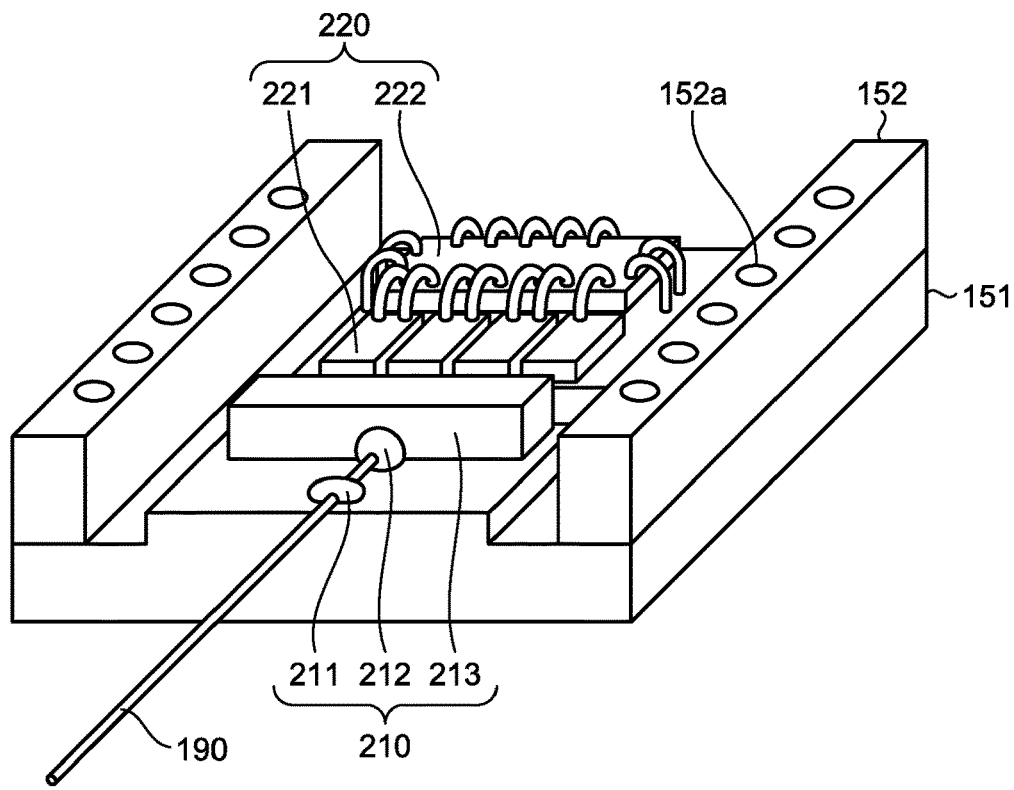
FIG. 13 illustrates another example of the configuration of the optical processing unit.

While the connection structure part 152 rises from three sides at the peripheral portion of the main board 151 in the above embodiment, the position of the connection structure part 152 is not limited thereto. For example, as illustrated in FIG. 13, the connection structure part 152 may rise from two opposite sides at the peripheral portion of the main board 151. Alternatively, for example, the connection structure part 152 is disposed at the four corners of the main board 151. That is, the connection structure part 152 does not necessarily need to be formed in one integral body and may be discretely disposed in a plurality of positions on the main board 151.

Figure 14:
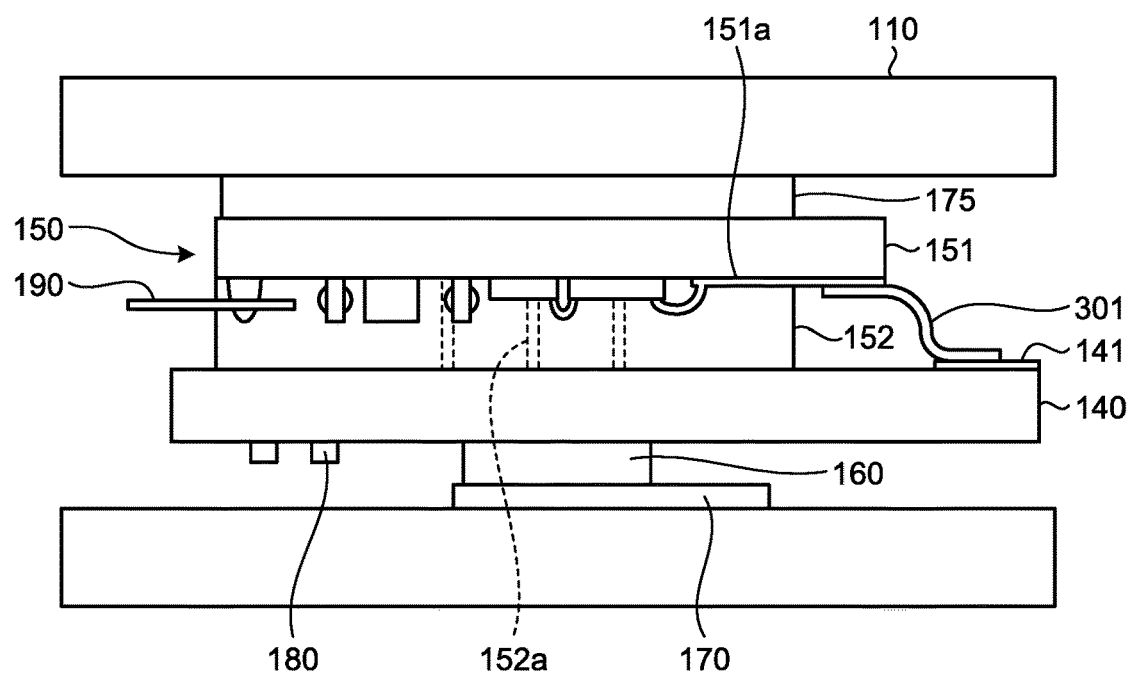
FIG. 14 illustrates connection between the optical processing unit and the circuit board.

While the peripheral components 220 are electrically connected to the interconnections 141 on the circuit board 140 through the via patterns 152a in the connection structure part 152 in the above embodiment, this example is not limiting. That is, for example, as illustrated in FIG. 14, the peripheral components 220 are electrically connected to the interconnections 141 on the circuit board 140 through a flexible printed circuit (FPC) board 301, which has flexibility. In such a case, for example, power-supply voltage may be supplied through the via patterns 152a in the connection structure part 152, high-frequency signals may be input and output through the FPC board 301. A configuration in which high-frequency signals are input and output through the FPC board 301 eliminates the need to take high frequency characteristics, such as permittivity, into consideration for selection of the material of the connection structure part 152, thus enabling flexible design.

According to an aspect of the optical module disclosed by the present application, the effect of successfully enabling both mounting of optical components by bonding and mounting of other components by reflow soldering can be produced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical module comprising:
a first board having an optical component bonded to a first surface with an adhesive and transmitting heat generated by a component mounted on the first surface to a second surface, the optical component constituting a spatial optical system through which an optical signal passes;
a heat dissipating member arranged at a position facing the second surface of the first board and configured to dissipate heat transmitted from the first surface to the second surface of the first board;
a connection structure part rising from the first surface side of the first board and made of a material having lower thermal conductivity than thermal conductivity of a material of the first board; and
a second board joined to the connection structure part.

2. The optical module according to claim 1, wherein
the first board has a peripheral component mounted thereon, the peripheral component being configured to perform conversion between an optical signal and an electrical signal, and
the connection structure part includes a conductor part that transmits, to the second board, an electrical signal input to or output from the peripheral component.

3. The optical module according to claim 1, wherein the second board has an electronic component on a position thereof that faces the first board.

4. The optical module according to claim 1, further comprising a cover member supported by the connection structure part and covering the optical component.

5. The optical module according to claim 1, further comprising a flexible printed circuit board having flexibility that connects an interconnection disposed on the first board and an interconnection disposed on the second board to each other.

6. The optical module according to claim 1, further comprising a heat dissipating member making contact with the first board and configured to dissipate heat generated by a component mounted on the first board.

7. The optical module according to claim 1, wherein the connection structure part is mounted on the second board by reflow soldering.

8. The optical module according to claim 1, wherein the optical component is mounted with a position error within 1 µm.

* * * * *